United States Patent [19]
Jolivette, Sr.

[11] Patent Number: 5,165,665
[45] Date of Patent: Nov. 24, 1992

[54] ADJUSTABLE COLLAPSIBLE JACK MECHANISM

[75] Inventor: Wilbert L. Jolivette, Sr., Houston, Tex.

[73] Assignee: Summer Manufacturing Co. Inc.

[21] Appl. No.: 782,963

[22] Filed: Oct. 25, 1991

[51] Int. Cl.$^5$ .............................................. B23Q 3/02
[52] U.S. Cl. ...................................................... 254/98
[58] Field of Search ........................... 254/98, 99, 100

[56] References Cited

U.S. PATENT DOCUMENTS

| | | | |
|---|---|---|---|
| 2,600,276 | 6/1952 | Smith | 254/99 |
| 2,960,308 | 11/1960 | O'Donnell | 254/98 |
| 3,084,911 | 4/1963 | Spiselman | 254/98 |
| 3,313,505 | 4/1967 | Petrie | 254/98 |

*Primary Examiner*—Robert C. Watson
*Attorney, Agent, or Firm*—James L. Jackson & Assoc.

[57] ABSTRACT

The adjustable jack mechanism of this invention incorporates a base structure having a support tube, with a plurality of angulated leg supports projecting radially therefrom and which allow pivoting of the support legs to positions parallel with the support tube. A plurality of support legs are pivotally connected to the leg support elements and are stabilized relative to the support tube by a support ring and pivotal support links. An elevation tube is telescopically movable within the support tube and is selectively locked relative thereto by a primary lock including a locking ring that is angulated by an external locking element for frictional gripping relation with the elevation tube. A jack screw is telescopically positioned within the elevation tube and is vertically adjustable by rotation of an adjustment nut for raising or lowering an object support provided at the upper end thereof. An auxiliary lock is provided which includes a locking pin being movable radially through aligned locking apertures of the support tube and elevation tube and is capable of locking engagement with the jack screw, thus securing the elevation tube and jack screw in assembly with the base structure to prevent inadvertent separation thereof from the base structure during handling, transportation and storage thereof.

19 Claims, 2 Drawing Sheets

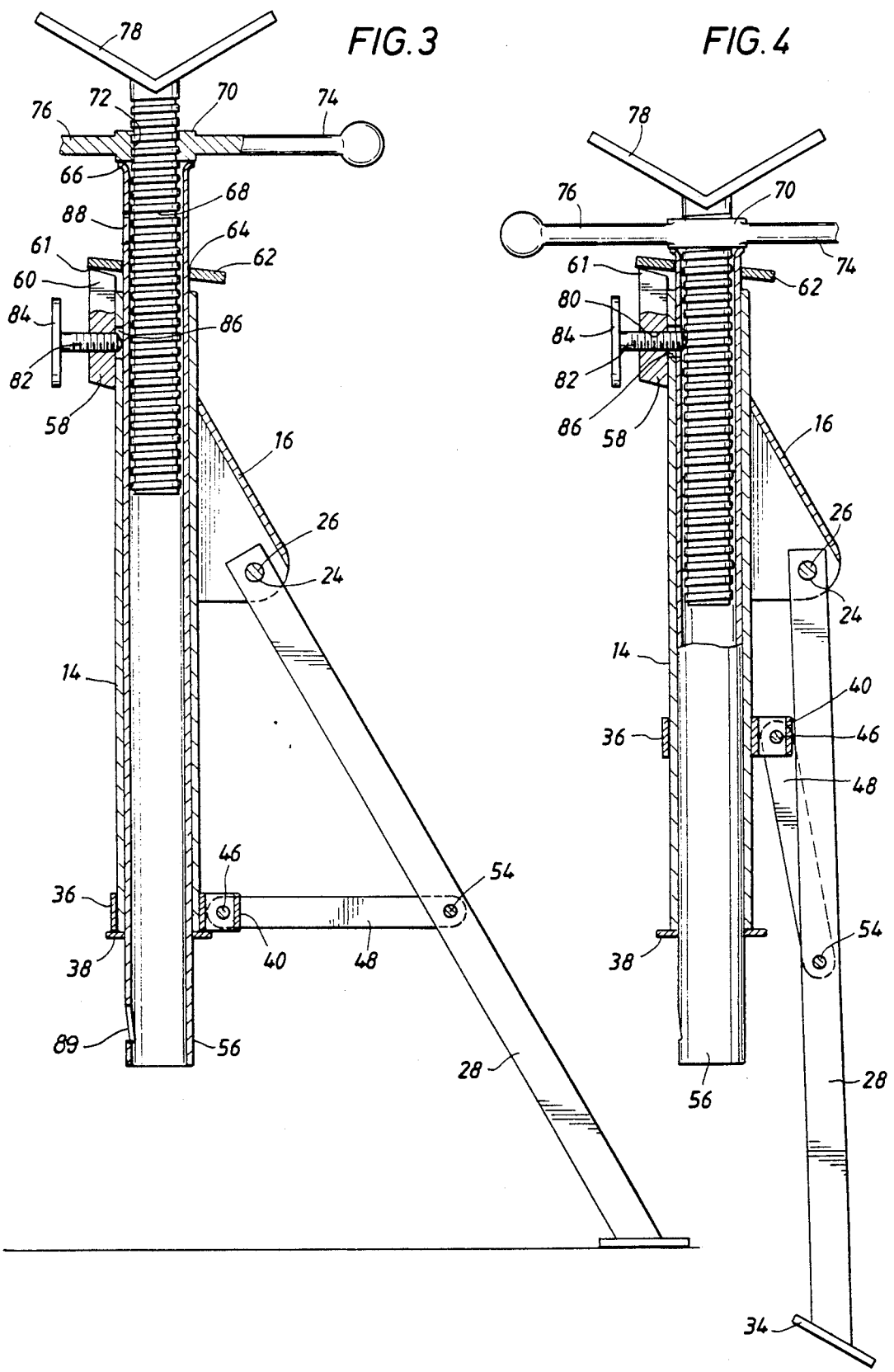

ADJUSTABLE COLLAPSIBLE JACK MECHANISM

FIELD OF THE INVENTION

This invention relates generally to jacks or jack stands of the three-legged type which are typically employed during construction operations for support of objects such as pipe and which incorporate jack screws enabling the object support thereof to be precisely vertically adjustable. More particularly, the present invention is directed to an adjustable, collapsible high/low type jack mechanism which incorporates means to secure the linearly movable telescoping components thereof in retained assembly to prevent inadvertent separation thereof during storage, transportation and handling.

BACKGROUND OF THE INVENTION

Small, portable, generally triangular screw jacks have been employed for many years for the temporary support of mechanical objects during construction or other working operations. Screw jacks are especially useful in the support and alignment of pipe such as for positioning adjacent pipe sections and pipe fittings in precise alignment for welding operations. For the support of pipe, screw thread type pipe jacks are typically provided with various types of support heads depending upon the construction operation that is to be accomplished. For example, one type of support head may take the form of a V-shaped cradle that receives the pipe to be supported. This type of object support is known in the industry as a "V-head". Where the pipe is to be supported for rotation, a pipe support head having horizontally arranged, spaced rollers may be employed. This type of object support is referred to as a "roller head".

One particular type of screw jack is known as the "High/Low Screw Jack". It incorporates a generally triangular base incorporating a vertically oriented support tube. An elevation tube is received in telescoping relation within the support tube and may be manually raised or lowered to position the object support near its desired position. This adjustment may be referred to as a "coarse adjustment". Thereafter, the jack screw, which is located in telescoping relation within the elevation tube, is manipulated upwardly or downwardly to achieve precise positioning of the support head. This character of adjustment may be referred to as a "fine adjustment".

One of the disadvantages of high/low type screw jack mechanisms is the difficulty of maintaining the telescoping parts thereof in assembly during storage and handling. With the jack lying on its side during transportation, the vibration that typically occurs will often allow the telescoping parts to become separated. In such case, the loose telescoping components of the jack mechanism can become lost or damaged. Additionally, the jack screw, being unprotected by the elevation tube, can become damaged and its lubricant can become contaminated. In the event these types of pipe jacks are inverted for any reason, such as during handling in connection with construction activities, the telescoping components will simply slide apart and become separated. These components are sufficiently light-weight so that the jack mechanisms may be handled manually, but in a construction environment, these loose parts, especially the jack screw, can fall and constitute a hazard to workers. It is desirable, therefore, to provide a suitable means for maintaining the telescoping components of high/low type jack mechanisms in assembly while they are being handled or transported so that the telescoping components can not become separated from the jack and thus can not become lost or constitute a hazard to workers during construction operations.

Another disadvantage of these generally triangular pipe jacks is the difficulty of storage and handling. Since the pipe jacks are of generally triangular form, and since in most cases the legs thereof are fixed to the support tube, the space requirements for storage, handling, transportation, is quite significant. It is desirable, therefore, to provide a high/low screw type jack mechanism having support legs that are capable of being folded to substantially parallel relation with the support tube so that the space requirements for storage, handling, transportation, etc. is minimized.

Most high/low screw jack mechanisms employ a support tube of cylindrical configuration and also incorporate an elevation tube of cylindrical configuration being received in telescoping relation within the support tube. Typically, this type of jack mechanism incorporates a lock mechanism enabling the elevation tube to be secured in substantially immovable relation with the support tube. Typically, this type of lock mechanism is of the friction type and incorporates an externally threaded shaft that is received by an internally threaded receptacle of the support tube and is capable of being extended through an aperture in the support tube for frictional engagement with the outer cylindrical surface of the elevation tube. Although this type of friction lock is beneficial to retain the elevation tube in assembly with the support tube, there is no provision for securing the jack screw in assembly with the support tube.

The jack screw mechanism typically incorporates a drive nut that is received by the coarse Acme threads of the jack screw and being rotatably adjustable relative to the jack screw. The drive nut typically defines opposed operating handles for rotation thereof relative to the jack screw. In operation, the drive nut simply rests on the upper extremity of the elevation tube so that rotation of the drive nut achieves vertical movement of the jack screw and the support head carried by the jack screw. Thus, the jack screw, during handling or transportation of the jack can easily become separated from the other components of the jack mechanism and can become lost or damaged. For example, the Acme threads may become damaged to the extent that replacement of the jack screw becomes necessary. Further, the jack screw is often provided with a viscous paste-like lubricant that minimizes wear and friction as the drive nut is rotated. Should the jack screw become separated from the jack mechanism, obviously, the lubricant that coats the threads of the jack screw can become contaminated quite easily in the construction environment. When this happens, obviously it must be cleaned and relubricated. This becomes a disadvantage because the labor required to service the jack mechanism in this manner detracts from the commercial viability of the construction operation. It is desirable, therefore, to provide means for insuring against separation of the jack screw from the support tube and thus preventing the threads of the jack screw from becoming damaged or contaminated.

Portable, high/low screw jacks having folding legs for the purpose of minimizing the overall dimension thereof for purposes of storage and handling are known in the art. In most cases folding legs are simply attached to pivot connections that are provided upon the outer periphery of the support tube. In such cases, even when folded, the legs are disposed in angular relation with the support tube so that the folding jack mechanism is of substantial dimension at one end thereof. It is desirable, therefore to provide a folding leg mechanism for high/low type screw jacks that enable the legs to be folded to a position substantially parallel with the outer surfaces of the support tube to thereby minimize its overall dimension for efficiency of storage and handling.

SUMMARY OF THE INVENTION

It is a principle feature of the present invention to provide a novel screw-type high/low jack mechanism having telescoping adjustable support components which are capable of being secured in assembly to prevent inadvertent separation thereof while the jack mechanism is not in use and is being handled, stored, transported, etc.

It is also a feature of this invention to provide a novel locking mechanism for high/low screw jack mechanisms that incorporates the capability of selectively locking both the elevation tube and jack screw thereof in substantially immovable relation with the support tube as desired.

It is an even further feature of this invention to provide a novel high/low type screw jack mechanism of generally triangular configuration in use and incorporating a folding leg assembly enabling the support legs thereof to be pivoted to a position in substantially parallel relation with the support tube for efficiency of storage and handling.

Among the several features of this invention is contemplated the provision of a selective locking mechanism that enables the jack screw of high/low type screw jack mechanisms from becoming separated from the elevation tube and thus providing the jack screw with protection against damage of the screw threads thereof and protection against contamination of the lubricant with which the jack screw is provided.

Briefly, the various objects and features of the present invention are realized through the provision of a high/low screw jack mechanism that incorporates a base structure having pivotal support legs that, during use, are positioned in angulated relation with a vertically oriented support tube and which support legs are capable of being folded to a substantially parallel relation with the support tube, such as for ease of handling, storage, transportation, etc. The jack mechanism is also provided with an elevation tube which is telescopically received within the support tube and which is selectively vertically adjustable in relation to the support tube within limits determined by the length of the elevation tube. A lock mechanism is employed to enable the elevation tube to be retained at a selected elevation relative to the support tube. A supplemental or auxiliary lock is provided for the jack mechanism which may be selectively actuated to secure the elevational tube against vertical telescoping movement relative to the support tube and which also engages the jack screw and secures the jack screw against both rotational movement and linear movement relative to both the support tube and the elevational tube. This supplemental or auxiliary lock is employed to secure the elevational tube and the jack screw in substantially immovable assembly with the support tube such as for the ease of storage and handling thereof and to secure the safety of the work place under circumstances where the jack mechanism is not being employed to support objects. The supplemental lock is positionable at an inoperative position during times when the jack mechanism is being employed for the support of objects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 1:
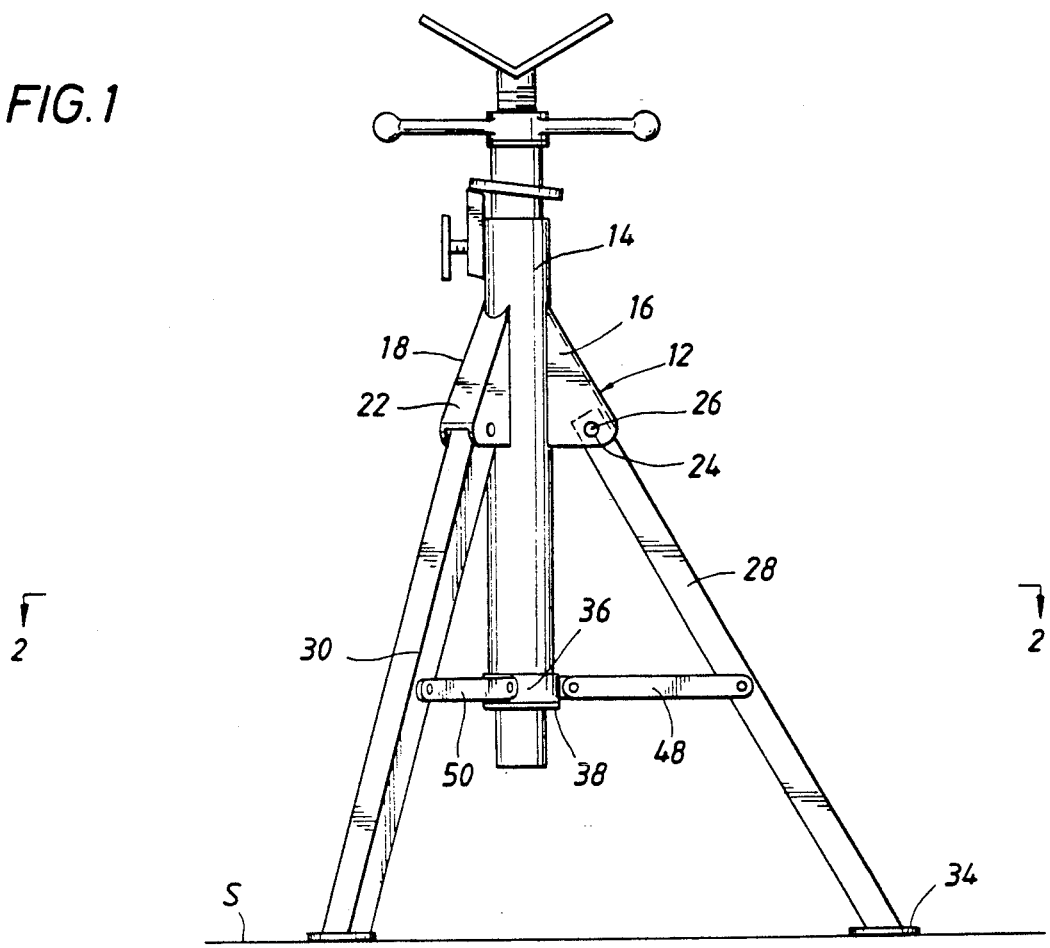

FIG. 1 is an elevational view of a high/low screw jack mechanism that is constructed in accordance with the present invention, the jack mechanism being illustrated in its operative condition for objects.

Figure 2:
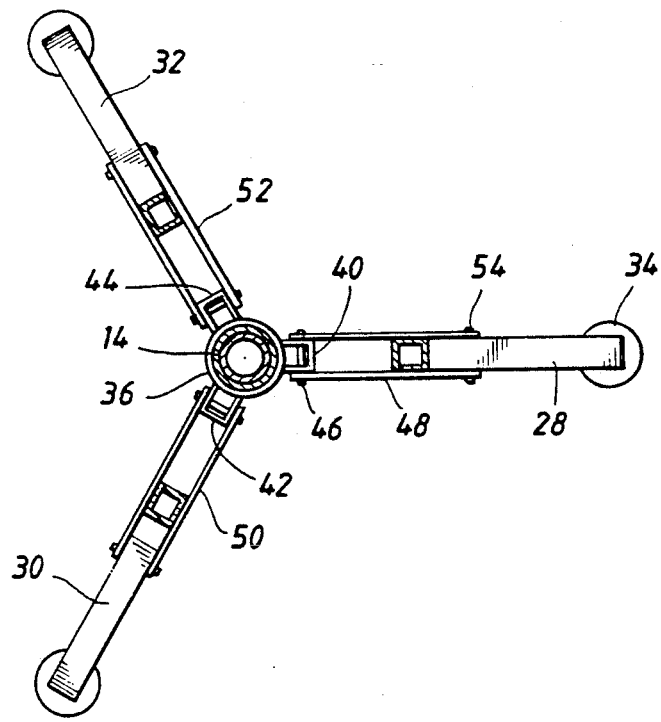

FIG. 2 is a sectional view of the high/low screw jack mechanism of FIG. 1, taken in plan along line 2—2 of FIG. 1.

FIG. 3 is a vertical sectional view of the high/low screw jack mechanism of FIGS. 1 and 2 and illustrating the folding leg mechanism thereof in its extended or operative position and showing the supplemental or auxiliary lock mechanism thereof in its position.

FIG. 4 is a sectional view similar to that of FIG. 3, but illustrating the folding leg mechanism in its collapsed or folded position and further illustrating the auxiliary lock mechanism at its locked position.

DETAILED DESCRIPTION OF PREFERRED EMBODIMENT

Referring now to the drawings and first to FIGS. 1 and 2, an adjustable, collapsible high/low screw jack mechanism constructed in accordance with the present invention is illustrated generally at 10 and incorporates a folding base structure illustrated generally at 12. The base structure of the screw jack mechanism incorporates a support tube 14 of generally cylindrical configuration, having three leg support elements 16 and 18 projecting laterally therefrom. The third leg support element is not seen in FIG. 1, but it is identical to the leg support elements 16 and 18. The three leg support elements are equally spaced about the outer periphery of the support tube 14 and because of the three-legged jack configuration, have incremental spacing of about 120° therebetween. Should the jack mechanism be desired to have more than three legs, obviously the spacing between the leg support elements will be less than 122°. As shown, the leg support elements 16-18 are of generally triangular configuration having outer inclined surfaces 22 that intersect the cylindrical outer surface of the support tube at the upper extremities thereof. The leg support elements 16-18 may be fixed to the support tube 14 in any suitable manner such as by welding, by integral casting, etc. At the lower extremities thereof, the leg support elements each define pivot apertures 24 through which extend pivot pins 26 that secure support legs 28, 30 and 32 in pivotal relation with respective leg support elements. At their lower ends each of the support legs 28-32 are provided with support pads 34 that are positioned for supporting engagement with a substantially horizontal surface such as the floor or work surface S.

For stabilization of the folding legs 28-32 at the extended or operative positions thereof as shown in FIG. 1, a leg stabilization ring 36 is movably received about the outer periphery of the support tube 14 and is movable upwardly from the position shown in FIGS. 1 and 3 to the position shown in FIG. 4 during collapsing of the support legs of the jack mechanism. Downward movement of the leg stabilization ring 36 is limited by a circular flange 38 that is fixed to the lower end of the support tube and functions as a stop flange for the leg stabilization ring.

From the leg stabilization ring 36 projects three connector projections 40, 42 and 44. These projections are welded or otherwise fixed to the leg stabilization ring and are oriented at substantially 120° spacing relative to one another, in similar manner as the angular spacing of the angulated support elements 16 and 18. The leg stabilization connector projections are each in the form of brackets that radiate from the leg stabilization ring and define apertures that receive pivot pins 46 to retain pairs of leg stabilization links 48, 50 and 52 in pivotal relation therewith. The brackets 40, 42 and 44 are shown to be of rectangular configuration but, if desired, they may be of circular cross-sectional configuration or of any other suitable configuration to accomplish the intended purpose. At the opposite ends thereof the leg stabilization braces 48-52 are pivotally secured to the respective support legs 28, 30 and 32 by means of pivot pins 54.

To collapse the support legs 28-32 of the jack mechanism 10 an upward force is applied to one of the leg stabilization links 48-52, thereby applying an upward force to the leg stabilization ring 36 causing it to slide upwardly along the outer surface of the support tube. This feature allows the legs to be moved pivotally toward one another and toward the support tube. In this connection it should be noted that the pivot apertures of the leg support elements 16-18 are positioned sufficiently laterally of the support tube 14 that the legs 28-32, when fully collapsed will be disposed in substantially parallel relation with the support tube 14. This is accomplished by positioning the pivot apertures 24 sufficiently radially outwardly relative to the support tube 14 that the legs 26, when completely folded, will be in substantial engagement with the outer portions of the respective leg stabilization projections or brackets 40-44 as shown in FIG. 4. Thus, when fully collapsed, the jack mechanism will be of quite small dimension, thereby allowing it to be stored or transported with efficiency.

As mentioned above, it is typically for elevation tubes of high/low jack mechanisms to be utilized for gross vertical adjustment of the jack mechanism when the jack is not under load and for a jack screw to be employed for fine adjustments and for adjustments that must be accomplished under load. The present invention employs a somewhat conventional elevational tube arrangement which is found in many high/low jack mechanisms. An elevation tube 56 of slightly less external dimension, as compared with the internal dimension of the support tube 14, is loosely positioned in telescoping relation within the support tube. It is intended that the elevation tube be telescopically movable relative to the support tube by application of manual force only when the jack mechanism is not under load. Thus, for gross adjustment of the jack mechanism, the elevational tube is simply manually moved vertically to an appropriate extent and is then locked against downward movement by the load to which the jack is subjected. For locking the elevation tube 56 for load support, a primary locking element 58 is fixed, such as by welding or by any other suitable means, to the outer periphery and at the upper extremity of the support tube 14 as shown in FIGS. 1. 3 and 4. The primary locking element is provided with a tapered upper extremity 60 which defines a reaction point 61 positioned for engagement by the outer periphery of a releasable locking element 62. The locking element 62 is preferably in the form of a flat washer having a central opening 64 of sufficient diameter that the locking element is normally easily slidable along the length of the elevation tube 56. When the desired position of the elevation tube 56 has been achieved relative to the support tube, the locking element 62 is moved downwardly until its outer peripheral portion comes into contact with the point 61 of the tapered upper end of the primary locking element 58. The locking ring 62, upon application of downwardly directed force thereto becomes inclined relative to the elevation tube such that its inner periphery establishes tight frictional locking engagement with the outer cylindrical surface of the elevation tube. The greater the downwardly directed force on the releasable locking element, the greater is its gripping and locking characteristics with the outer cylindrical surface of the elevation tube. Upward force on the locking element 62, however will cause it to release its locking engagement with the elevation tube.

The basic structure of the jack mechanism is completed by the provision of a fine adjustment mechanism in the form of a jack screw. The upper extremity of the elevation tube 56 is preferably defined by an out-turned upper flange portion 66. A jack screw 68, defining course Acme threads, is positioned in telescoping relation within the upper end of the elevation tube 56. An adjustment nut 70 defines internal course Acme threads 72 that receive the threads of the jack screw. The adjustment nut also defines opposed operating handles 74 and 76 that enable it to be rotated manually in order to achieve vertical positioning movement of the jack screw 68. At its upper end, the jack screw is provided with an object support 78 which, as shown in the drawings, is in the form of a V-shaped support typically referred to as a "V-head" which is typical for the support of cylindrical objects such as pipe. With a section of pipe being supported by the object support or V-head of the jack screw, fine positional adjustment of the pipe or other object is achieved simply by rotation of the adjustment nut 70 in one direction for raising and the opposite direction for lowering. The object support 78, typically referred to in the industry as the "support head" may take any one of a number of suitable forms such as the V-head shown in FIGS. 1-3 or spaced rollers called a "roller head" (not shown) for rotatable support of pipe for example, to facilitate ease of welding to join the pipe sections or to join pipe fittings to the pipe sections.

As mentioned above, it is desirable to provide a mechanism for accomplishing locking of both the elevation tube and the jack screw against linear movement relative to the support tube 14. According to the present invention, one suitable means for accomplishing this feature may conveniently take the form shown, where the primary locking element 58 is provided with an auxiliary locking mechanism which is defined by an internally threaded transverse bore 80 in the primary locking element which receives an externally threaded locking pin 82 having an external wing 84 enabling it to be manually rotated. The locking pin 82 is extendible through a first locking aperture 86 of the support tube 14 and is capable of establishing a frictional locking engagement with the outer cylindrical surface of the elevation tube 56 as shown in FIG. 3. Thus, the locking pin may be manually tightened on the elevation tube to secure the elevation tube against linear telescoping movement relative to the support tube.

At its upper portion the elevation tube 56 defines a locking aperture 88 which is capable of being disposed in registry with the locking aperture 86 of the support tube in the manner shown in FIG. 4. Alignment of the locking aperture 88 with the locking aperture 86 is made practical by a position indicator 89 which is located at the lower end of the elevation tube 56. As shown, the position indicator is an arrow shaped hole which is in vertical alignment with the locking aperture 88. The elevation is moved downwardly and is rotated to align the position indicator 89 with the locking pin 82 which also rotationally aligns the locking aperture 88 with locking aperture 86. When the elevation tube is so positioned relative to the support tube as shown in FIG. 4, the locking pin 82 is simply rotated sufficiently to drive its inner end through the aligned first and second locking apertures and into locking engagement with the jack screw 68. When this has been accomplished, the elevation tube is disposed in locked engagement with the support tube such that it can not telescope outwardly and the jack screw is locked against rotational movement and against outward telescoping movement relative to the elevation tube. In this manner the entire jack mechanism is secured in locked assembly so that the telescoping components thereof can not become inadvertently separated as it is being handled or transported. Even when the jack mechanism is completely inverted, the telescoping components including the elevation tube and the jack screw, will remain in substantially fixed relation with the support tube.

Thus, in the condition shown in FIG. 4, the jack mechanism is capable of having its support legs folded to a substantially parallel relation with the support tube so that its physical dimension is minimized for the purpose of storage, handling and transportation. Additionally, as also shown in FIG. 4, an auxiliary locking mechanism may be efficiently employed to secure both the elevation tube and the jack screw against linear movement relative to the support tube. This feature protects the telescoping components of the jack mechanism from becoming inadvertently separated and lost during storage, handling and transportation thereof and also it prevents the lubricated threads of the jack screw from becoming exposed to the work environment and being contaminated by dirt and other debris and from becoming damaged by contact with foreign objects.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. An adjustable jack mechanism for supporting objects, comprising:
   (a) a base structure adapted to rest on a flat surface and having a plurality of legs disposed in angulated relation with one another, said base structure further having a substantially vertically oriented support tube;
   (b) an elevation tube being received in slidable telescoping relation within said support tube;
   (c) primary locking means for releasably locking said elevation tube at any selected telescoping position in relation to said support tube;
   (d) an externally threaded jack screw being received within said elevation tube and having an object support at the upper end thereof;
   (e) an adjustment nut being threadedly received by said externally threaded jack screw and being rotatable for vertical adjustment of said jack screw; and
   (f) auxiliary locking means for selectively locking said elevation tube and said externally threaded jack screw in substantially immovable relation with said support tube;
      (1) said support tue and said elevation tue respectively defining first and second locking apertures;
      (2) an auxiliary locking element being supported by said base structure and having a locking portion being extended through said first locking aperture of said support tube for frictional locking engagement with said elevation tube; and
      (3) with said first and second locking apertures in registry said auxiliary locking element being selectively movable through said first and second locking apertures and into locking engagement with said externally threaded jack screw.

2. An adjustable jack mechanism for supporting objects comprising:
   (a) a base structure adapted to rest on a flat surface and having a plurality of legs disposed in angulated relation with one another, said base structure further having a substantially vertically oriented support tube;
   (b) an elevation tube being received in slidable telescoping relation within said support tube;
   (c) primary locking means for releasably locking said elevation tube at any selected telescoping position in relation to said support tube;
   (d) an externally threaded jack screw being received within said elevation tube and having an object support at the upper end thereof;
   (e) an adjustment nut being threadedly received by said externally threaded jack screw and being rotatable for vertical adjustment of said jack screw;
   (f) said support tube defining a first locking aperture and said elevation tube defining a second locking aperture being positionable in registry with said first locking aperture; and
   (g) an auxiliary locking element being supported by said support tube and being selectively extendible through said first locking aperture for locking engagement with said elevation tube and being selectively movable through said first and second locking apertures when the same are disposed in registry for locking said elevation tube against axial movement relative to said support tube and for locking said externally threaded lock screw against both rotational movement and telescoping movement relative to said support tube.

3. The adjustable jack mechanism of claim 1, wherein said primary locking means for releasably locking said elevation tube at any selected telescoping position in relation to said support tube comprises:
   (a) a primary locking element being fixed externally of said support tube and defining a lock operating point located radially outwardly of said support tube and above said support tube; and
   (b) a locking ring being received in movable relation about said elevation tube and being of sufficient dimension for engagement at the outer peripheral portion thereof with said lock operating point of said primary locking element, said locking ring establishing an inclined position relative to said elevation tube responsive to application of downwardly directed force thereto by said elevation tube for frictional gripping and retention of said elevation tube in locked relation with said support tube.

4. The adjustable jack mechanism of claim 2, wherein:
   said auxiliary locking element being movable radially through said first and second locking apertures and into locking engagement with said externally threaded jack screw when said first and second locking apertures are in registry.

5. The adjustable jack mechanism of claim 4, wherein:
   said auxiliary locking element is an externally threaded locking pin being supported for driving rotation by said primary locking element, said auxiliary locking pin being linearly movable for locking engagement with said externally threaded jack screw upon rotation thereof relative to said primary locking element.

6. The adjustable jack mechanism of claim 1, including:
   (a) a plurality of support legs being pivotally supported by said base structure and being positioned in inclined relation with said support tube;
   (b) a leg stabilization ring being disposed about said support tube for vertical sliding movement relative thereto, said leg stabilization ring having a plurality of leg stabilization projections extending radially therefrom;
   (c) a plurality of leg stabilization links each being pivotally interconnected with respective leg stabilization projections and support legs and being movable upwardly and in pivotal relation with said leg stabilization projections and in pivotal relation with said support legs upon folding of said support legs.

7. The adjustable jack mechanism of claim 6, wherein:
   said pivotal connection of said support legs with said base structure is radially displaced from said support tube sufficiently that, upon folding of said support legs the inner surfaces of said support legs are disposed in juxtaposed relation with said leg stabilization projections and in substantially parallel relation with said support tube.

8. The adjustable jack mechanism of claim 1, wherein:
   (a) said base structure defines a plurality of radially projecting leg support elements each forming a pivot aperture; and
   (b) pivot means interconnecting said support legs with said leg support elements at respective pivot apertures thereof.

9. The adjustable jack mechanism of claim 8, including:
   (a) a stop flange being provided at the lower extremity of said support tube;
   (b) a leg stabilization ring being movably disposed about said support tube, said leg stabilization ring defining a plurality of leg stabilization projections extending radially therefrom, each of said leg stabilization projections defining a pivot aperture; and
   (c) a plurality of leg stabilization links being pivotally interconnected at one of the extremities thereof to said leg stabilization projections and at the opposite extremities thereof to said support legs upon folding of said support legs, said leg stabilization links causing upward movement of said leg stabilization ring relative to said support tube.

10. The adjustable jack mechanism of claim 9, wherein:
    downward movement of said leg stabilization ring relative to said support tube being limited by said stop flange.

11. An adjustable jack mechanism for supporting objects, comprising:
    (a) a base structure adapted to rest on a flat surface and having a plurality of legs disposed in angulated relation with one another, said base structure further having a substantially vertically oriented support tube, said support tube defining a first locking aperture;
    (b) an elevation tube being received in slidable telescoping relation within said support tube and defining a second locking aperture being positionable in registry with said first locking aperture;
    (c) primary locking means for releasably locking said elevation tube at any selected telescoping position in relation to said support tube;
    (d) an externally threaded jack screw being received within said elevation tube and having an object support at the upper end thereof;
    (e) an adjustment nut being threadedly received by said externally threaded jack screw and being rotatable for vertical adjustment of said jack screw; and
    (f) auxiliary locking means having a radially movable auxiliary locking element being receivable through said first and second locking apertures for selectively locking said elevation tube and said externally threaded jack screw in substantially immovable relation with said support tube.

12. The adjustable jack mechanism of claim 11, wherein:
    (a) said auxiliary locking means being supported by said base structure and said auxiliary locking element having a locking portion for extension through said first locking aperture of said support tube for frictional locking engagement with said elevation tube; and (b) with said first and second locking apertures in registry said locking portion being selectively movable through said first and second locking apertures and into locking engagement with said externally threaded jack screw.

13. The adjustable jack mechanism of claim 11, wherein:

said auxiliary locking element being supported by said support tube and being selectively extendible through said first locking aperture for locking engagement with said elevation tube and being selectively movable through said first and second locking apertures when the same are disposed in registry for locking said elevation tube against axial movement relative to said support tube and for locking said externally threaded lock screw against both rotational movement and telescoping movement relative to said support tube.

14. The adjustable jack mechanism of claim 11, wherein said primary locking means comprises:

(a) a primary locking element being fixed externally of said support tube and defining a lock operating point located radially outwardly of said support tube and above said support tube; and (b) a locking ring being received in movable relation about said elevation tube and being of sufficient dimension for engagement at the outer peripheral portion thereof with said lock operating point of said primary locking element, said locking ring establishing an inclined position relative to said elevation tube responsive to application of downwardly directed force thereto by said elevation tube for frictional gripping and retention of said elevation tube in locked relation with said support tube.

15. The adjustable jack mechanism of claim 14, wherein:

said auxiliary locking element is an externally threaded locking pin being supported for driving rotation by said primary locking element, said auxiliary locking pin being linearly movable for locking engagement with said externally threaded jack screw upon rotation of said externally threaded locking pin relative to said primary locking element.

16. The adjustable jack mechanism of claim 11, including:

(a) a plurality of support legs being pivotally supported by said base structure and being positioned in inclined relation with said support tube;

(b) a leg stabilization ring being disposed about said support tube for vertical sliding movement relative thereto, said leg stabilization ring having a plurality of leg stabilization projections extending radially therefrom;

(c) a plurality of leg stabilization links each being pivotally interconnected with respective leg stabilization projections and support legs and being movable upwardly and in pivotal relation with said leg stabilization projections and in pivotal relation with said support legs upon folding of said support legs.

17. The adjustable jack mechanism of claim 16, wherein:

said pivotal connection of said support legs with said base structure is radially displaced from said support tube sufficiently that, upon folding of said support legs the inner surfaces of said support legs are disposed in juxtaposed relation with said leg stabilization projections and in substantially parallel relation with said support tube.

18. The adjustable jack mechanism of claim 11, wherein:

(a) said base structure defines a plurality of radially projecting leg support elements each forming a pivot aperture; and (b) pivot means interconnecting said support legs with said leg support elements at respective pivot apertures thereof.

19. The adjustable jack mechanism of claim 18, including:

(a) a stop flange being provided at the lower extremity of said support tube;

(b) a leg stabilization ring being movably disposed about said support tube, said leg stabilization ring defining a plurality of leg stabilization projections extending radially therefrom, each of said leg stabilization projections defining a pivot aperture; and (c) a plurality of leg stabilization links being pivotally interconnected at one of the extremities thereof to said leg stabilization projections and at the opposite extremities thereof to said support legs upon folding of said support legs, said leg stabilization links causing upward movement of said leg stabilization ring relative to said support tube.

* * * * *